United States Patent [19]

Fischbeck et al.

[11] 4,121,227

[45] Oct. 17, 1978

[54] INK JET ARRAY WITH ISOLATED FLUID RECTIFIER LAYERS

[75] Inventors: Kenneth H. Fischbeck, Dallas; Richard H. Vernon, Richardson, both of Tex.

[73] Assignee: Xerox Corporation, Stamford, Conn.

[21] Appl. No.: 777,272

[22] Filed: Mar. 14, 1977

[51] Int. Cl.[2] .......... G01D 15/16

[52] U.S. Cl. .......... 346/140 R

[58] Field of Search .......... 346/140 R

[56] References Cited

U.S. PATENT DOCUMENTS

| | | | |
|---|---|---|---|
| 3,747,120 | 7/1973 | Stemme | 346/140 R X |
| 3,940,773 | 2/1976 | Mizoguchi | 346/140 R |

*Primary Examiner*—Joseph W. Hartary

[57] ABSTRACT

A coincidence ink jet array system is disclosed wherein each ink jet has two inlet passages communicated to an outlet orifice. An ink droplet is expressed from the orifice only when pressure pulses applied to the inlet passages coincide at the orifice. Two main fluid supply passages are provided, one of which traverses across the jets at the upper portion of a housing and the other which traverses across the jets at the lower portion of the housing. A plurality of separate fluid rectifier passages interconnect the supply passages with a respective one of the jets to provide a fluid layer at a location between its respective outlet orifice and its respective inlet passages. This connection of the jets with separate fluid rectifier passages isolates each jet from another to either prevent or substantially limit "cross-coupling" (pressure communication) between the jets.

4 Claims, 7 Drawing Figures

FIG. 1
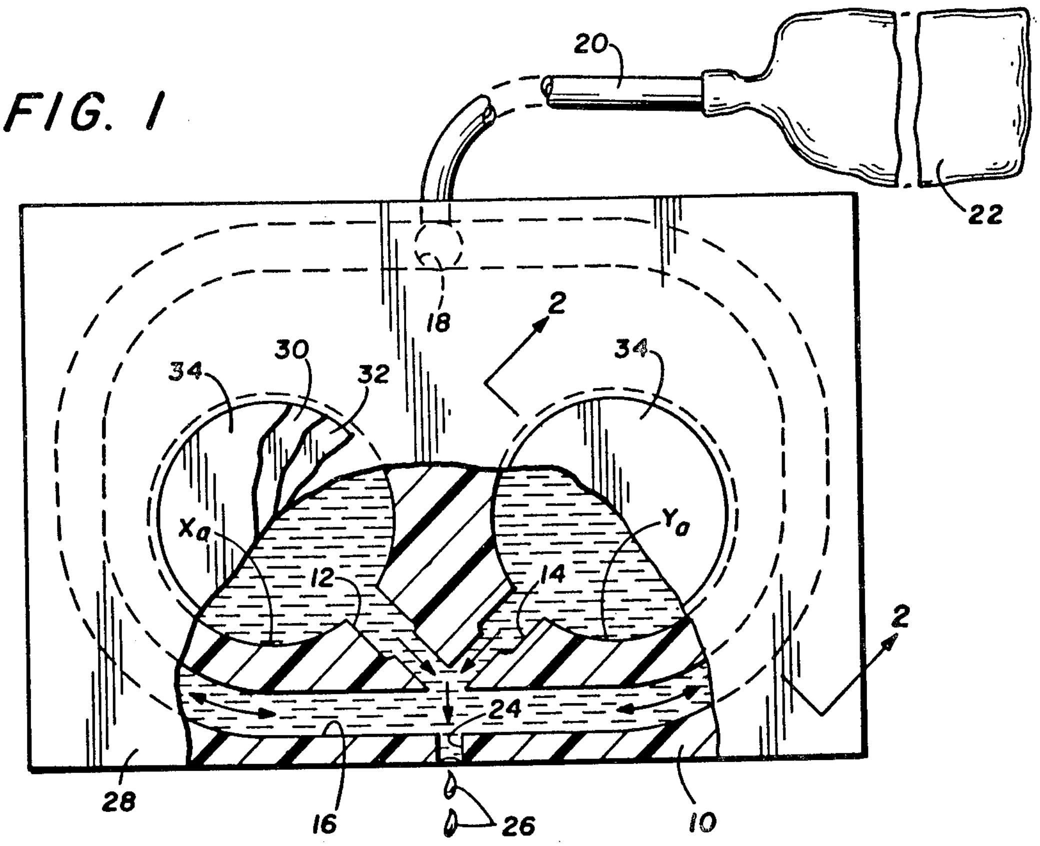
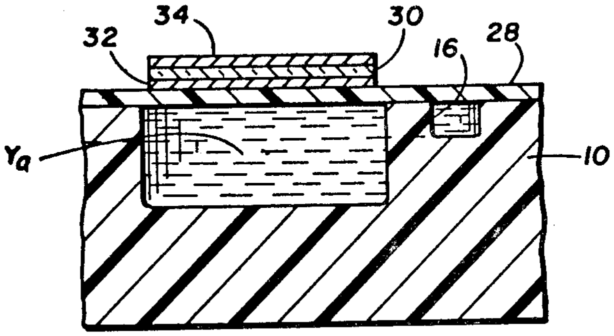
FIG. 2

INK JET ARRAY WITH ISOLATED FLUID RECTIFIER LAYERS

DESCRIPTION OF INVENTION

This application relates to copending U.S. application Ser. No. 731,407 (common assignee) and claims subject matter disclosed but not claimed therein.

This invention concerns an ink jet array which has a fluid rectifier for each orifice.

Fluid rectifiers for an orifice of a single jet and of an array of jets are disclosed by U.S. Pat. No. 3,747,120, which has issued to Erick Stemme. In the disclosed device, FIG. 12, there is a fluid rectifier chamber defining a common layer 17 of fluid between respective inlet passages and their respective orifices of the ink jet array. This design has a limitation in that at high pressures undesirable "cross-coupling" (pressure communication) within the fluid layer between the orifices can occur thereby causing unwanted pressure build-up at an unaddressed jet. This pressur build-up can cause a droplet to be expressed from an unaddressed jet or cause meniscus vibration thereat.

It is an object of this invention to reduce or substantially eliminate "cross-coupling" between the orifices of an ink jet array which has a fluid rectifier layer located between a respective orifice and a respective inlet passage of each jet.

Other objects of the invention will become apparent from the following description with reference to the drawings wherein:

FIG. 1 is a cutaway view of a sample ink jet assembly;

FIG. 2 is a view taken along section line 2—2 of FIG. 1;

Figure 4:
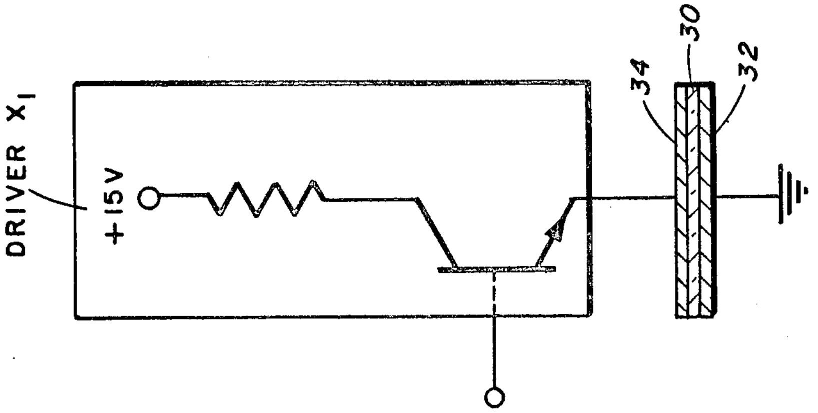
FIG. 4 is a schematic of a typical electronic driver electrically connected to a piezoelectric member.

Referring to FIG. 1, a cutaway view of one member 10 of an ink jet housing assembly is shown illustrating the principles of a coincidence gate ink jet. A pair of transducer chambers $X_a$ and $Y_a$ is provided in the member 10. Fluid pressure passages 12 and 14 lead from the chambers $X_a$, $Y_a$, respectively, to a liquid ink supply rectifier passage 16 where the three passages intersect. The liquid ink supply passage 16 is communicated to a port 18 which in turn is communicated through a conduit 20 to an ink supply reservoir 22, located remotely from the housing, which comprises a sealed flexible bag. Also, at the intersection is an outlet orifice 24 through which ink droplets 26 are expressed onto a copy medium.

Referring to FIG. 2, the chambers and passages are sealed by a flat flexible layer 28 bonded to the member 10. The transducer chambers $X_a$, $Y_a$ are fluid tight except for passages 12 and 14 communicating therewih. The transducer chambers and passages 12, 14 and 16 are completely filled with liquid ink. A piezoelectric ceramic member 30 is sandwiched between and bonded to a pair of electrodes 32 and 34 with the electrode 32 being bonded to the layer 28 thereby effectively bonding the piezoelectric member 30 thereto. The piezoelectric member 30 is polarized during the manufacture thereof to contract in a plane parallel to the plane of the flexible layer 28 when excited by applying a voltage potential across the conductive members 32 and 34. Contraction of the piezoelectric member 30 will cause the flexible layer 28 to buckle inwardly thereby decreasing the volume in its respective chamber and effecting pressure on the liquid ink therein. The members 10 and 28 of the housing may be glass or plastic.

When the piezoelectric member for either transducers $X_a$ or $Y_a$ is activated, a fluid pressure pulse will occur in a respective one of passages 12 and 14 causing displacement of ink along the respective passage. The passages 12 and 14 are at such an angle relative to the orifice 24, the impedance to liquid flow in passage 16 relative to the impedance to liquid flow in orifice 24, and the magnitude and duration of a pressure pulse exerted by the transducer chambers $X_a$, $Y_a$ are designed that the ink stream expressed from only one passage at a time will entirely miss orifice 24 and displace the ink in the ink supply passage 16 while the ink within orifice 24 will not be disturbed to the extent of expressing a droplet therethrough. The orifice 24 is so located relative to the intersection of the passages 12, 14 and the magnitude and duration of the pressure pulse exerted by the transducer chambers $X_a$, $Y_a$ are so designed that the summation vector of the fluid momentum vectors in passages 12 and 14 will lie on the axis of the orifice 24. Thus, only when the piezoelectric members for both transducer chambers $X_a$, $Y_a$ are activated in a manner that pressure pulses generated by the respective transducers coincide from the intersection of passages 12, 14 to the orifice 24 will an ink droplet 26 be expressed from orifice 24. It should be understood that the peaks of the pressure pulses generated by both transducers do not necessarily coincide between the intersection of passages 12 and 14 and the orifice 24, but there must be at least an overlap of the pressure pulses thereat. In this illustration, the orifice is hydraulically equal distance from each transducer chamber, and the piezoelectric members for both transducers will be simultaneously or coincidently activated.

Since the transducer chambers are fluid tight except for the passages 12 and 14 communicating therewith, at the termination of a pressure pulse, ink is drawn into the passage 12 or 14 from which ink was expressed. If a pulse is applied to only one of the passages 12, 14, then most of the ink expressed therefrom will be drawn back into the passage with the remainder of the ink drawn into the passage being supplied from supply passage 16. If a pulse was applied to both passages 12, 14 simultaneously, resulting an ink droplet being expressed from orifice 24, then ink from supply passage 16 will be drawn into both passages 12, 14 after pulse termination. Thus, the ink within the pressure chambers $X_a$, $Y_a$ and most of passages 12, 14 is stagnant or confined therein and acts only as a mechanical ram for expressing ink droplets through the orifice 24 with the ink forming the droplets being supplied form the reservoir 22.

Figure 3:
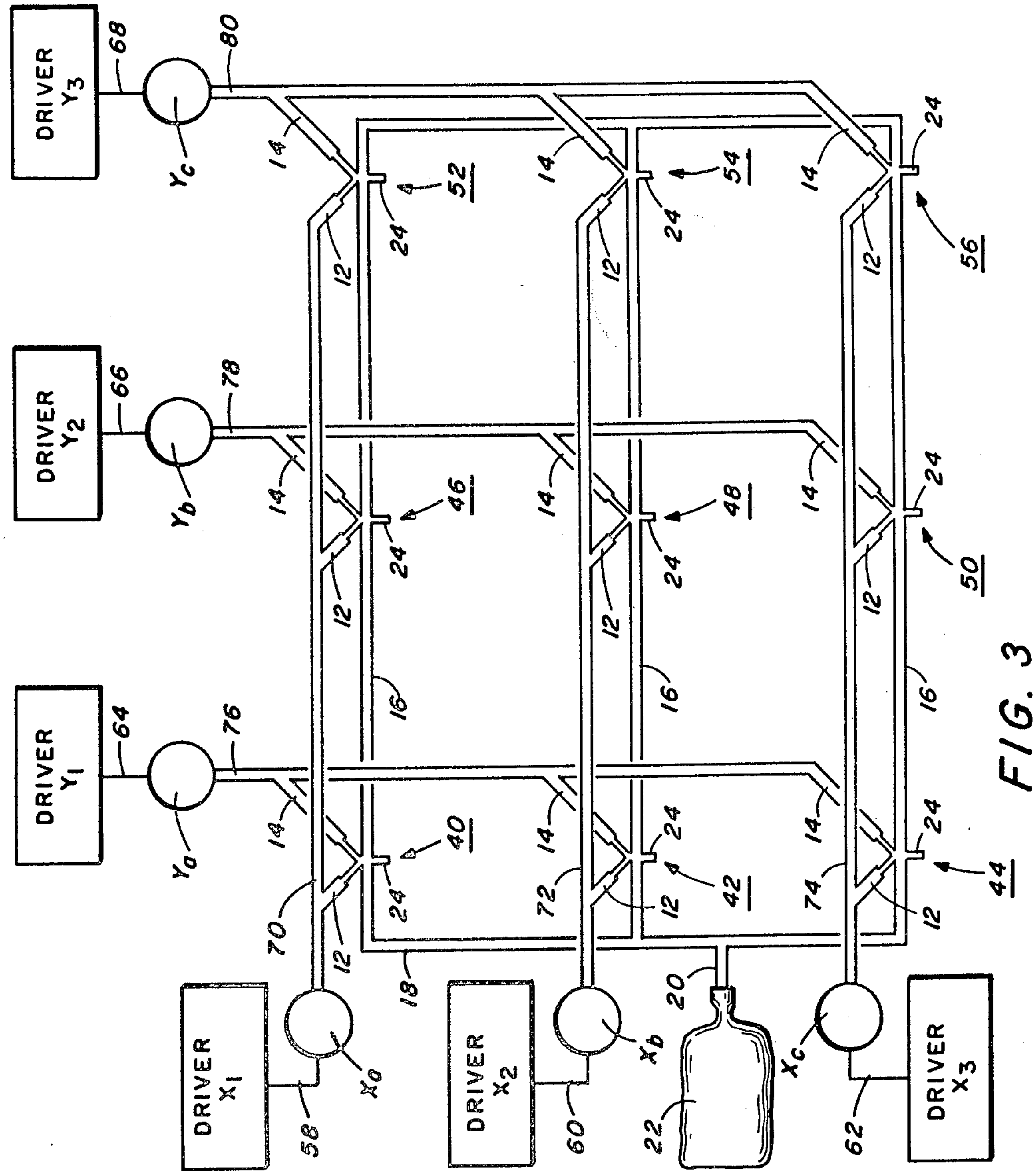
FIG. 3 is a schematic fluid circuit for an ink jet array.

Referring now to FIG. 3, a schematic fluid circuit is illustrated for an array of nine coincidence gate ink jets 40, 42, 44, 46, 48, 50, 52, 54 and 56 each of which has two pressure passages 12, 14, and ink supply passage 16 and an outlet orifice 24. Six electrical input drivers $X_1$, $X_2$, $X_3$, $Y_1$, $Y_2$ and $Y_3$ are electrically connected to a piezoelectric member 30 of transducer chambers $X_a$, $X_b$, $X_c$, $Y_a$, $Y_b$, $Y_c$, respectively, by a respective one of electrical lines 58, 60, 62, 64, 66 and 68.

Referring to FIG. 4, there is illustrated a piezoelectric member 30 electrically connected to a typical electronic driver which is an NPN type transistor in an emitter follower configuration driven between a non-conductive state and a state of saturated conduction in response to positive going pulse-like input signals supplied to the base of the transistor. All of the electronic drivers are electrically connected to their respective piezoelectric members in the same manner.

Referring back to FIG. 3, a conduit 70 communicates transducer chamber $X_a$ with pressure inlets 12 of jets 40, 46 and 52; conduit 72 communicates transducer chamber $X_b$ with pressure inlets 12 of jets 42, 48 and 54; conduit 74 communicates transducer chamber $X_c$ with pressure inlets 12 of jets 44, 50 and 56; conduit 76 communicates transducer chamber $Y_a$ with pressure inlets 14 of jets 40, 42, and 44; conduit 78 communicates transducer chamber $Y_b$ with pressure inlets 14 of jets 46, 48 and 50 and conduit 80 communicates transducer chamber $Y_c$ with pressure inlets 14 of jets 52, 54 and 56. The transducer chambers, conduits and pressure inlets as well as pulse duration and magnitude are all designed that the hydraulic properties at each ink jet are the same. Since an orifice may be hydraulically unequal distances away from the two transducers to which it is communicated, the transducers, in actual practice, will be activated out of phase with each other so the pressure pulse generated by each transducer will occur coincidently from the intersection of the pressure inlets 12, 14 to the orifice 24. The following table shows which jets express droplets therefrom when particular drivers are energized:

| Electronic Drivers Cooperatively Energized | Droplet Expressed From Jet |
|---|---|
| $X_1,Y_1$ | 40 |
| $X_1,Y_2$ | 46 |
| $X_1,Y_3$ | 52 |
| $X_2,Y_1$ | 42 |
| $X_2,Y_2$ | 48 |
| $X_2,Y_3$ | 54 |
| $X_3,Y_1$ | 44 |
| $X_3,Y_2$ | 50 |
| $X_3,Y_3$ | 56 |

Figure 5:
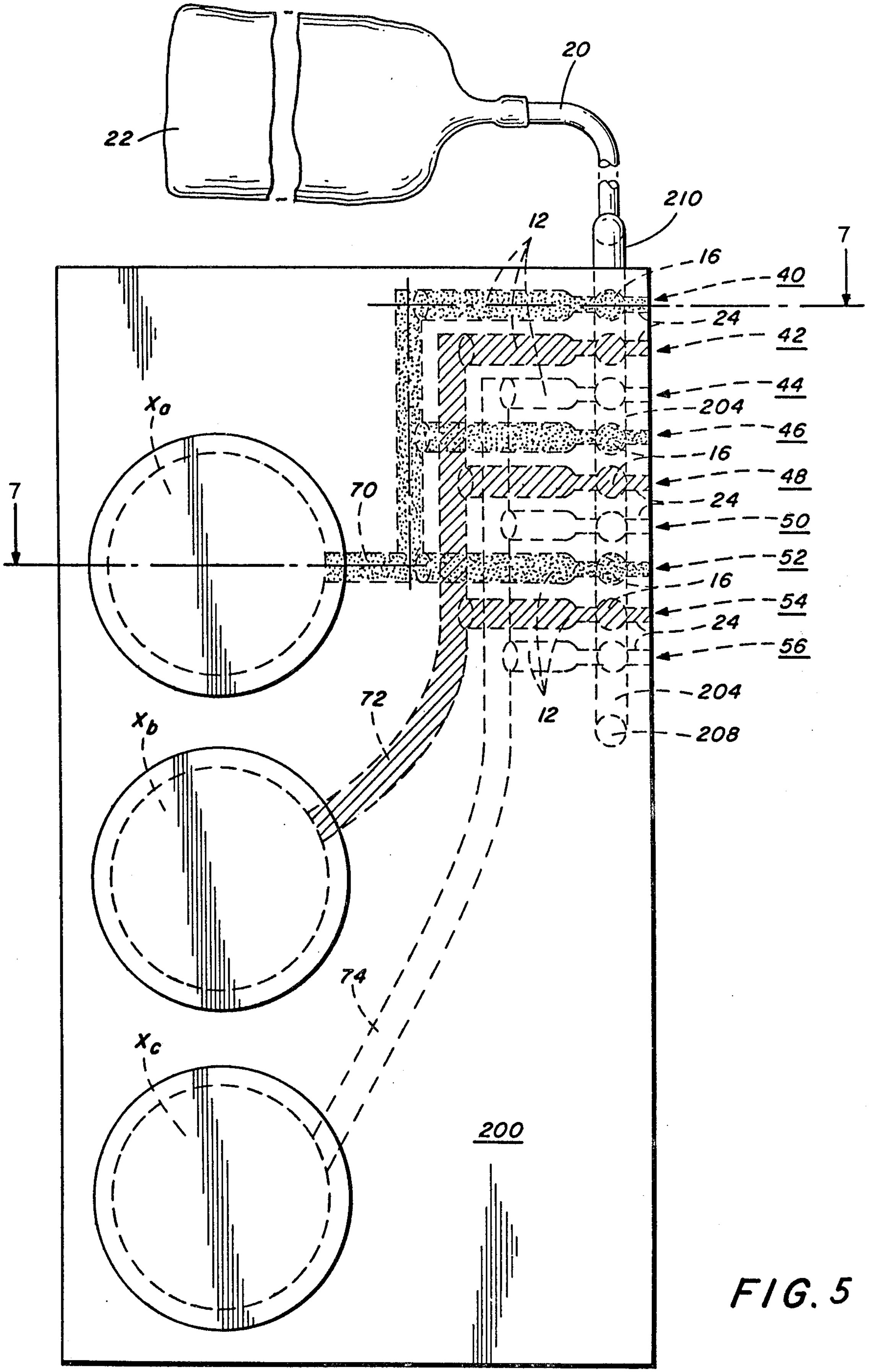
FIG. 5 is a top view of a linear array ink jet assembly.
Figure 6:
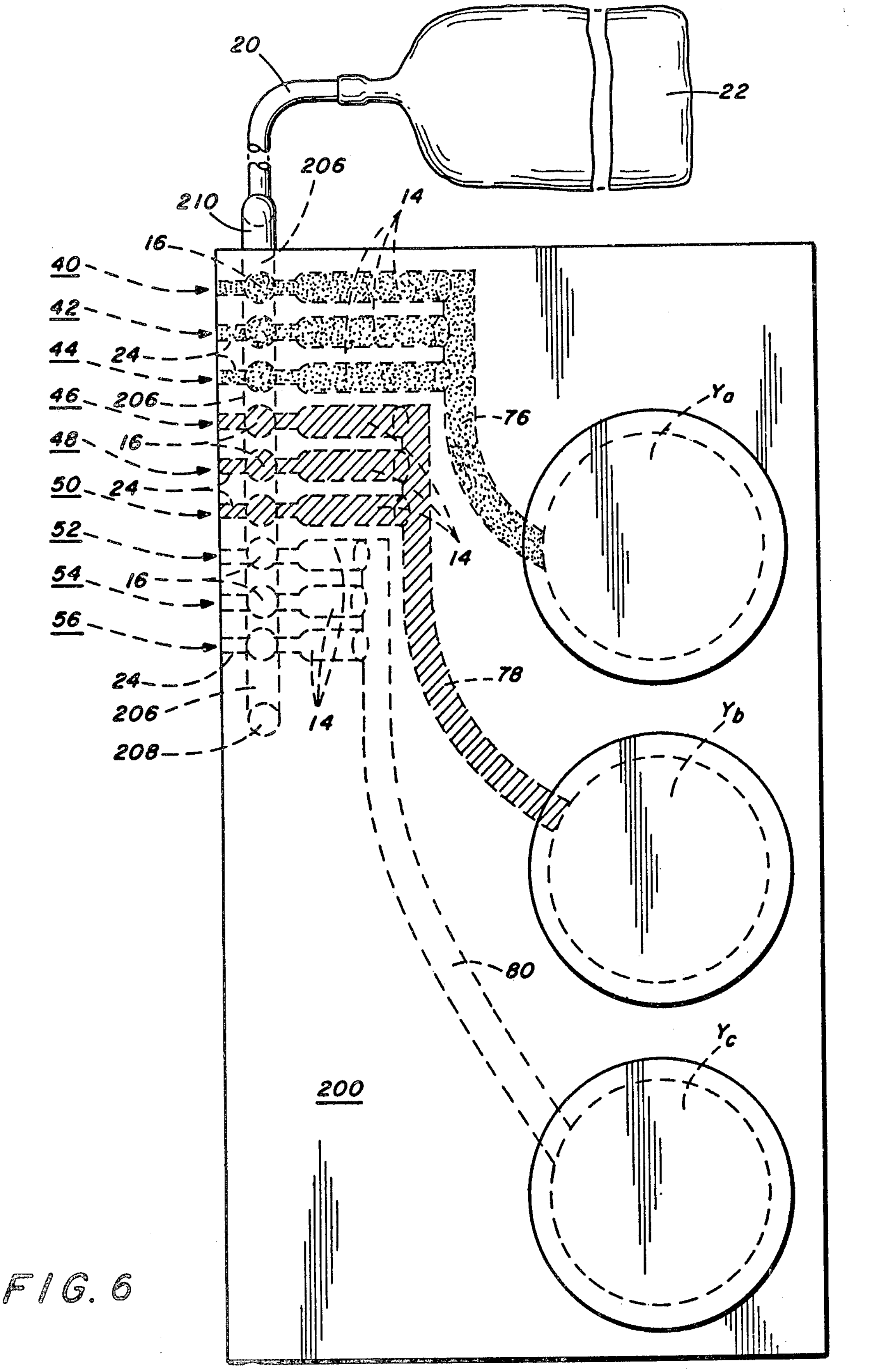
FIG. 6 is a bottom view of the assembly of FIG. 6.
Figure 7:
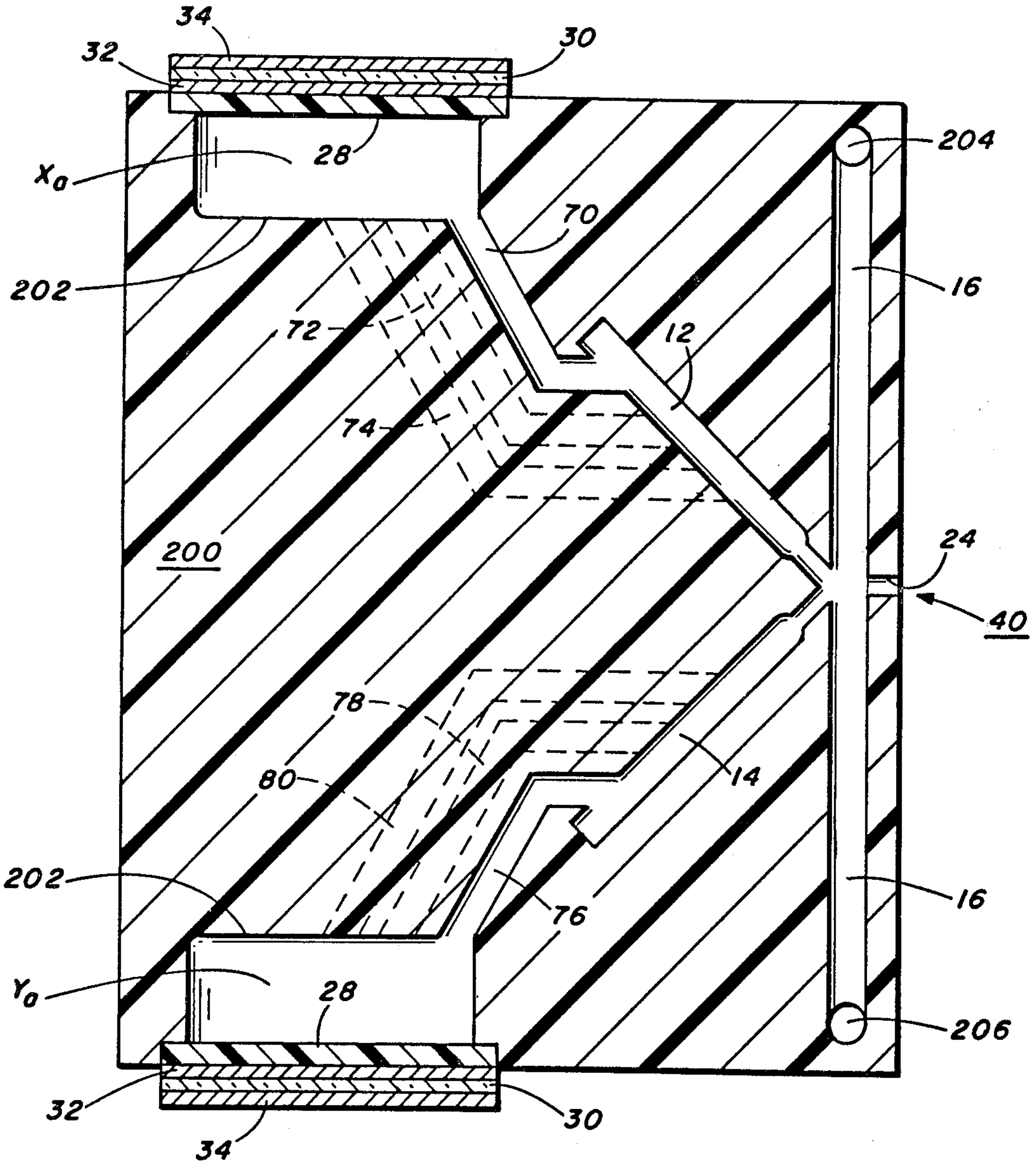
FIG. 7 is a view taken along section line 7—7 of FIG. 6.

Referring to FIGS. 5–7, a nine-jet ink jet assembly in accordance with the schematic of FIGS. 3 and 4 is illustrated with the same elements of FIGS. 1,2,4 and 5 being designated by the same reference numerals. For clairity, FIG. 6 illustrates the fluid passages for only the transducers $X_a$, $Y_b$, and $X_c$; and FIG. 7 illustrates the fluid passages for only the transducers $Y_a$, $Y_b$ and $Y_c$. Also, some of the passages are cross-hatched and filled with dots for clarity in showing separate passages. A housing 22 contains the transducers and fluid passages therein. The fluid passages may be made by drilling and plugging holes where necessary and the transducer chambers may be milled in the housing. Referring to FIG. 7, each main passage 70, 72, 74, 76, 78 and 80 and its respective branch lines leading from the transducers to the inlet passages cross the other main passages and their respective branch lines at different levels since they are not to communicate with each other. All of the branch lines are located at a level between the wall 202 of opposite transducer chambers $X_a$ and $Y_a$ to permit drilling the branch passages without intersecting the chambers $X_a$ and $Y_a$. The ink supply passage 16 for each jet branches off from two parallel main supply passages 204, 206. The passage 204 traverses across the jets at the upper portion of housing 200 and passage 206 traverses across the jets at the lower portion of housing 200. The main supply passages 204, 206 are joined at one end inside the housing by a cross-passage 208 and at the other end by an external C-shaped tubular fitting 210. A flexible bag ink reservoir 22 is communicated to the tubular fitting 210 by a conduit 20.

Each of the fluid rectifier passages 16 provides a fluid wall between a respective outlet orifice and a respective intersection of passages 12 and 14 to assure continuity of fluid in the passages thereby preventing air pockets from forming. The individual passages 16 branching off from the common main supply passages 204, 206 isolate each respective orifice 24 and its respective pressure inlet passages 12, 14 from the other orifices and their respective pressure inlet passages. Any pressure change in jet 40 will be primarily dissipated in the main supply passages 204, 206 with an insignificant amount of pressure change being transmitted to the passages 16 of the other jets 42–56. This is explained as follows. A pressure build-up is caused by velocity of fluid movement into passage 16. This velocity vector in passage 16 is at right angles to main supply passages 204 and 206 and is substantially dissipated at the intersection thereof. Furthermore, the remaining velocity vector in passage 204 and 206 is at right angles to the other rectifier passages 16 placing the fluid in shear at the intersections thereof with the supply passages 204, 206. This isolation construction is an important feature to eliminate or reduce "cross-coupling" (substantial pressure communication) between the jets. If, instead of isolating the orifices from one another, the rectifier supply passage 16 is at the same level as the orifices 24, extends in the same direction as passages 204 and 206, and intersects all of the orifices, any pressure change at one orifice would be felt at an adjacent orifice causing possible misfiring of a droplet or setting up of unwanted meniscus vibration due to "cross-coupling" between the orifices through the fluid rectifier passage. For example, if the passage 12 and passage 14 of jet 56 and 52, respectively, were pressurized at the same time, a droplet might possibly be expressed from jet 54 or there will be a pressure build-up at jet 54 due to "cross-coupling". Even if a droplet is not expressed from jet 54, meniscus vibration may be set in motion at jet 54 creating undesired effects. Similarly, expression of a droplet from one orifice can set up meniscus vibration at an adjacent orifice due to "cross-coupling".

While the use of separate fluid rectifier supply passages 16 for isolating the orifices of an array of coincidence gate ink jets are shown, it should be readily understood that the same arrangement can also apply to arrays of ink jets wherein each jet has one transducer and a droplet is expressed therefrom each time the transducer is actuated.

What is claimed is:

1. A multiple ink jet assembly comprising:

a plurality of orifices arranged adjacent each other in a longitudinal array, inlet passage means for each jet adjacent a respective orifice, a fluid reservoir, fluid supply passage means communicated with said fluid reservoir and extending in a longitudinal direction across said jets, a plurality of fluid rectifier passage means spaced from one another and extending in a direction generally transverse to and communicating with said fluid supply passage means, each said fluid rectifier passage means being in communication with a respective jet at a location between its respective orifice and a respective inlet passage means to provide a fluid layer therebetween communicated to said reservoir.

2. The structure as recited in claim 1, wherein said fluid supply passage means comprises two separate passage means extending in a longitudinal direction and being generally parallel to each other, said fluid rectifier passage means for each jet comprising two passage means each of which is communicated at one end to a respective one of said fluid supply passage means and is communicated at the other end to its respective jet at said location.

3. The structure as recited in claim 2, wherein said array of orifices are located between said two fluid supply passage means.

4. The structure as recited in claim 3, wherein said two fluid supply passage means, said two rectifier passage means, and the location of said fluid layer are in substantially the same plane.

* * * * *